(12) United States Patent
Fiedrich

(10) Patent No.: US 6,299,071 B1
(45) Date of Patent: Oct. 9, 2001

(54) HYDRONIC HEATING WITH CONTINUOUS CIRCULATION

(75) Inventor: Joachim Fiedrich, Carlisle, MA (US)

(73) Assignee: Stadler Viega, LLC, Bedford, MA (US)

(*) Notice: Subject to any disclaimer, the term of this patent is extended or adjusted under 35 U.S.C. 154(b) by 0 days.

(21) Appl. No.: 09/336,538

(22) Filed: Jun. 19, 1999

(51) Int. Cl.[7] .................................................. F24D 3/00
(52) U.S. Cl. ........................................... 237/8 R; 237/70
(58) Field of Search ............................. 237/8 R, 63, 56

(56) References Cited

U.S. PATENT DOCUMENTS

| | | | |
|---|---|---|---|
| 4,157,158 | * 6/1979 | Kitamura et al. | 236/48 R |
| 4,203,545 | * 5/1980 | Fackler | 236/93 A |
| 4,238,071 | * 12/1980 | Post | 236/49 |
| 4,738,394 | * 4/1988 | Ripka | 236/20 R |
| 4,880,157 | * 11/1989 | Boot et al. | 236/25 R |
| 5,347,956 | * 9/1994 | Hughes | 122/13.1 |
| 5,707,007 | * 1/1998 | Fiedrich | 237/8 R |

* cited by examiner

Primary Examiner—Harold Joyce
Assistant Examiner—Derek S. Boles
(74) Attorney, Agent, or Firm—Robert T. Dunn, Esq.

(57) ABSTRACT

In a hydronic heating system having a boiler hot supply water line and boiler return water line, a main hot supply water circulation loop from the boiler supply water line to the boiler return water line and one or more satellite stations in series along the main loop, for a satellite station: a satellite injection water connection and a satellite return water connection along the main loop; a satellite distribution station including one or more satellite heating loops; a satellite supply header and satellite return header at opposite ends of the satellite heating loops; a satellite station pump having an input and an output for pumping satellite water from the satellite return header to the satellite supply header so that satellite water flows through the satellite heating loop(s); a satellite injection water line from the satellite injection connection to the satellite pump input; a satellite return water line from the satellite pump output to the satellite return connection along the main loop; and a thermostatic temperature controller valve that modulates flow through the satellite return water line to the main loop to control satellite water temperature, the valve having a valve body that is immersed in said satellite water and a thermostatic actuator connected thereto providing a thermal path from the valve body to the actuator so that the thermal response of said actuator is determined by heat conducted thereto over said path.

5 Claims, 5 Drawing Sheets

HYDRONIC HEATING WITH CONTINUOUS CIRCULATION

BACKGROUND OF THE INVENTION

This invention relates to hydronic heating systems for dwellings, offices, etc. and more particularly to radiant heating systems having one or more satellite distribution stations feeding heating loops at different water temperature and so providing multi-temperature heating loop operation.

Hydronic heating systems for heating the rooms in a dwelling, office, etc, are used widely in Europe and to a lesser extent in the United States. Water heated in a boiler is distributed to heating loops of tubing in the dwelling that carry the heat by radiation, conduction and convection to the rooms in the dwelling. A common technique provides a boiler hot water supply feeding the supply header of the distribution system for the heating loops and the boiler water return to which the system return header of the heating loops connects. The return water is heated in the boiler and sent out again to the distribution system as hot supply water, and so the water is cycled through the essentially closed system. One or more water pumps in this system keep the water flowing and valves control water flow rates through the loops depending on demand for heat.

A heating loop may include several heating elements like baseboard finned tubing or wall mounted radiators that are the principal heat exchanger of the loop, or the tubing itself may be the principal heat exchanger of the loop. In the latter case the tubing may be installed "Dry" as described in the applicant's U.S. Pat. No. 5,292,065 issued Mar. 8, 1994, entitled "Radiant Floor And Wall Hydronic Heating Systems", on top of or under the rough floor or in the wall; or is installed "Wet", embedded in cement on top of the floor. In either case, heat exchange is principally by radiation. Hence, this type of heating is called Radiant Floor Heating (RFH). Similarly, when the tubing is buried in the wall, the heating is called Radiant Wall Heating (RWH).

In such RFH and RWH systems and other hydronic heating systems using baseboard finned tubing elements or wall mounted radiators, the supply water temperature from the boiler must be controlled so that it does not exceed certain limits that are substantially lower than the usual boiler supply water temperature. There are several reasons for this: first, the temperature of radiator elements on the wall must not be so high that they are not safe to touch; second, for RFH the floor temperature must not be uncomfortable hot; and third, where the tubing is plastic, the water temperature for some plastic materials must not exceed about 140° F.

In hydronic heating systems subject to such water temperature limitations, where the boiler is powered by burning fossil fuels, the boiler water supply temperature is usually well above 140° F. and often at about 180° F. to 200° F., (for laundry and dishwashers), and so the boiler supply temperature must be stepped down before it is fed to the heating loops.

In the past, it has been the practice to mix relatively cooler boiler return water with the hot boiler supply water to "dilute" the temperature of the supply water fed to the heating loops. An electrically controlled motorized three-way mixing valve has been used in the boiler supply line that feeds the supply header for the heating loops, between the boiler supply and the heating loops supply header. The mixing valve has two inputs and one output. One input is directly from the boiler hot water supply, the other input is from the return header of the heating loops and the output is directly to the supply header of the heating loops. The mixing valve motor is electrically energized by remote reset controls that sometimes respond to outside ambient temperature, inside room temperature, boiler water temperature, supply header water temperature, etc.

In an effort to reduce expense, non-motorized three-way valves have been used in the boiler supply line. Systems using non-motorized three-way valves with supply header water temperature feedback are described in the applicant's U.S. Pat. No. 5,119,988, which issued Jun. 9, 1992, entitled: "Hydronic Heating Water Temperature Control System". That patent describes several hydronic heating systems with a non-motorized (non-electric) three-way valve having supply water temperature feedback to the valve controller. In the preferred system, the valve is a three-way diverting valve in the boiler return water line. The diverting valve has one input and two outputs and diverts water from the return line (on the way from the heating loop return header to the boiler return), to the boiler supply line that feeds the loop supply header, diluting the supply water (reducing its temperature) that is fed to the heating loop supply header.

That patent also teaches use of a non-electric thermostatic actuator head attached to the diverting valve for positioning the valve stem and controlled by a thermostatic fluid contained in the actuator, a bulb temperature sensor and a capillary tube from the bulb to the actuator. Thus, the valve is modulated by non-electric feedback of the diluted supply water temperature. The bulb sensor may be inserted into the diluted supply water or it may be clamped to the supply line next to the supply header so that it is at the temperature of water in the supply header. The thermostatic fluid in the bulb expands with temperature applying a pressure force through the capillary to the actuator head and so the valve is modulated to increase or decrease the flow of return water through the valve as necessary to maintain the temperature of the heating loop supply header water at or below a predetermined value. That value can be set by a mechanical setting on the actuator head and so an accurate reading of the supply header water temperature is made continuously and simultaneously any deviation from the setting is immediately nulled by modulating the valve.

RFH and RWH systems using embedded plastic tubing and other hydronic heating systems using wall radiators and/or baseboard finned tubing elements are some of the different kinds of heating loops. Clearly, the temperature limitation of a heating loop depends first on how and where the loop is installed, creature comfort and the materials in the loop. As the term "Kind" of loop is used herein, it means the temperature requirements and limitations of the loop and so loops of the same "Kind" have the same temperature requirements and limitations. For example: the temperature of baseboard finned tubing radiator elements can be quite high, because they are metal tubes, can be shielded and are not usually touched, even accidentally, whereas wall radiators are not shielded and must not be too hot to touch; for RFH where the tubing is beneath the floor boards, the tubing can be hotter than where the tubing is on top of the floor boards; for RWH the tubing is often covered by only thin gypsum board and so must be well below 100° F.; and even the best cross-linked plastic tubing should not be exposed to water above 140° F.

Where the hydronic system with a three-way thermostatically controlled diverting valve in the return line for diluting the supply water temperature (as described above) is also responsive to outdoor temperature an outdoor temperature bulb sensor, a thermostatic valve actuator attached to the valve with capillary tubes connecting the common thermostatic fluid from the bulbs to the actuator are included so that loop water temperature is increased when outdoor temperature falls. The applicant has invented such a system, which is described in his U.S. Pat. No. 5,556,027, issued Sep. 17, 1996, entitled: "Hydronic Heating Outdoor Temperature Reset Supply Water Temperature Control System".

Since the temperature of boiler supply water fed to the main distribution station is usually well above 140° F. and often at about 180° F. to 200° F., the boiler supply water temperature may be all right for some "Kinds" of heating loops like baseboard finned copper tubing, but must be much lower for other "Kinds" of heating loops like RFH and RWH. The present application describes techniques and systems that provide several echelons of temperature ranges of loop supply water to accommodate the requirements of different "Kinds" of heating loops in a premises.

The applicant has invented a hydronic heating system with satellite distribution stations that operate at lower temperatures for multi-temperature heating loop operation. That invention is described in the applicant's U.S. Pat. No. 5,617,994, issued Apr. 8, 1997, entitled: "Hydronic Heating With Satellite Distribution Stations For Multi-Temperature Supply Water To Heating Loops". That patent describe a complete main distribution system (main station) with main supply and return headers, one or more main heating loops, a main circulation pump and a main three-way dilution control valve and feedback controls for the valve; each satellite station includes a complete satellite distribution system that has satellite supply and return headers, satellite heating loops and a satellite circulation pump; and water from the main supply header is injected into the satellite return header to add heat to the satellite station. Water flow between the main and satellite stations is balanced by a return of injected water from the satellite supply header to the main return header. Several techniques of modulating the heat flow to the satellite are disclosed in that patent application, including a modulating valve in the injection line or in the balancing return line between the main and satellite systems.

Where several such satellite stations are fed from the main station, as described in the applicant's aforementioned U.S. Pat. No. 5,617,994, heat (hot water) injection into each satellite is from the main supply header to the satellite return header and water flow is balanced by a return from the satellite supply header to the main return header. Thus, the satellites are in parallel with each other, as they all connect to the main at the same point and all return to the main at the same point, and the main and each satellite station has a complete distribution system with headers, a pump and station water temperature control.

The applicant has also invented a hydronic heating system with satellite distribution stations that operate at lower temperatures for multi-temperature heating loop operation wherein the satellite stations are in series along a main station loop from the boiler. That invention is described in the applicant's U.S. Pat. No. 5,707,004, issued Jan. 13, 1998, entitled: "Hydronic Heating With Continuous Circulation Supplying Multi-Temperature Heating Loops". That patent describe a complete main supply loop and several satellite stations is series along the main loop, each satellite station including a complete satellite distribution system and heating loops. In operation, water from the main loop is injected into the satellite pump input to add heat to the satellite station and water flow between the main loop and satellite is balanced by a return of water from the satellite pump output to the main loop.

A techniques of modulating the heat flow to the satellite in that patent, uses a three-way modulated diverting valve in the output flow from the satellite pump. That valve feeds the satellite supply header and the satellite return line to the main loop and is controlled by a thermostatic actuator that is driven by thermostatic fluid in a bulb feeding a capillary tube that connects to an actuating bellows in the actuator. The bulb is attached to the return line and so the driving fluid is at the temperature of the water flowing in the return line. When the return water temperature drops, the return water flow increases and so the supply water flow increases accordingly and so injected heat increases; and visa-versa.

The applicant herein has recognized a need for a simpler modulated thermostatic controller for the satellite station to maintain the satellite water temperature constant in the above system. Such a controller may not be required to change return water flow rate, but infrequently, and need not be required to directly control water flow from the pump output to the supply header and, preferably, does not require a thermostatic fluid bulb and capillary tube. Furthermore, it is desirable to be able to manually set the desired satellite temperature at the controller and that temperature thereafter be automatically maintained by the controller.

SUMMARY OF THE INVENTION

It is an object of the present invention to provide a simpler modulated thermostatic controller for the satellite station to maintain the satellite water temperature constant in the above system (aforementioned U.S. Pat. No. 5,707,007).

It is another object of the present invention to provide such a controller that need not directly control water flow from the pump output to the supply header and, preferably, does not require a thermostatic fluid bulb and capillary tube.

It is another object of the present invention to provide such a controller that can be manually set for the desired satellite temperature and thereafter automatically maintains that temperature in the water flow to the satellite loops.

It is an object of the present invention to provide a hydronic heating system for dwellings, offices, etc., having several satellites operating at different temperature ranges of loop supply water to accommodate the requirements of different kinds of heating loops, that is relatively less expensive than prior systems of equivalent capacity and which avoids some of the limitations and disadvantages of the prior systems and yet provides thermostatically modulated heat flow from the main to each satellite.

It is another object to provide such a hydronic heating system with two or more ranges of supply water temperature that is satisfactory to avoid feeding excessively high temperature boiler supply water to the system different kinds of heating loops.

It is another object to provide such a hydronic heating system with heating loop supply water temperature control that can be readily adjusted to change the desired water temperature feeding the system different kinds of heating loops.

It is another object to provide such a hydronic heating system with controls for heating loop supply water temperature that can be readily adjusted to change the desired water temperature feeding the system heating loops of different kinds, such as baseboard heaters, wall heaters, RFH tubing, RWH tubing and outdoor ice and snow melting.

It is a further object to provide an interchangeable modular unit for the satellite distribution stations that injects hot water from the main loop, pumps and mixes the satellite water and controls return water to the main to automatically maintain the satellite water temperature at an adjustable value.

According to the present invention the multi-temperature satellite heating loops by satellites in series along a main loop from the boiler are provided, each with a thermostatically controlled temperature control valve that directly controls water flow to the satellite return line to the main.

The control valve body is fully immersed in a chamber through which all of the water from the satellite pump to supply header flows and so all parts of the valve body are at the temperature of that water. The valve body includes the valve tapered plug, the valve seat, the valve plug stem and the valve spring that compels the valve to the fully open position (the plug fully removed from the seat). The valve stem projects through the chamber wall and the valve thermostatic actuator is attached to the outside of the chamber with the actuator stem in direct mechanical and thermal contact with the projecting valve body stem.

The actuator includes a spring loaded bellows in a sealed enclosure containing a thermostatic fluid and the actuator stem projects from the spring inside the bellows. When the actuator is attached to the outside of the chamber with the actuator stem in direct mechanical and thermal contact with the projecting valve body stem and both stems are made of highly thermally conductive material, heat is conducted readily between the satellite supply water and the actuator bellows and so the actuator bellows is at the same temperature as the supply water. The bellows, in turn, transmits heat directly to the thermostatic fluid in the actuator sealed enclosure around the bellows and as that fluid expands with rising temperature, the bellows is expanded driving the actuator stem against the valve body stem to compress the valve spring and close the plug against the seat. When that occurs, the return flow from the satellite to the main decreases, the injected water flow from the main to the satellite decreases and the temperature of the satellite supply water decreases. Thus, water temperature in the satellite loops is modulated so that it is maintained constant.

In preferred embodiments of the present invention the maximum open position of the valve can be set manually by manually adjusting the actuator so that the return water flow rate and, correspondingly, the injected water flow (the injected heat flow) into the satellite cannot exceed a maximum and so the satellite water temperature is limited to the manually set value.

Also, in preferred embodiments the satellites are interchangeable modular units, each manually set for operation at the most desirable temperature for the "Kind" of heating elements driven by the satellite and each modular unit includes an isolation valve that enables turning on the particular satellite without turning on the rest of the satellites and without turning on the main system pump.

These and other features of the present inventions are revealed by the following description of embodiments of the inventions taken in conjunction with the figures.

DESCRIPTION OF EMBODIMENTS OF THE INVENTION

An advantage of the present invention, as also in the aforementioned U.S. Pat. No. 5,707,007, is that only one main circulation loop operated at constant flow rate is required for several relatively low cost satellite stations each having its own circulation system that feeds one or more heating loops that operate at predetermined temperatures lower than the main system. This is a desirable system for heating a premises such as a dwelling and especially for RFH and RWH systems with multiple types of finish floor coverings (carpet/tile/wood flooring) or systems with multiple kinds of radiation (baseboard finned radiator elements, wall radiators, RFH or RWH heating).

Other advantages of the present invention, as also in the aforementioned U.S. Pat. No. 5,707,007, are that: one or more of the satellite stations can be turned on without turning on all of them; a single satellite station can be turned on without turning on the main system pump; a satellite station supply and return headers can be located in the room of the premises that is heated by the satellite heating loops and so the loop flow rate controls can be set in the room directly manually and the headers can be serviced in the room; and the satellite stations, except for the number of heating loops each feeds, can be comprised of interchangeable modular units that are identical in construction.

An advantage of the present invention over the systems described in the aformentioned U.S. Pat. No. 5,707,007 is that a thermostatically controlled temperature control valve is provided that directly controls water flow through the satellite return line to the main and does not require an actuator thermostatic fluid bulb and capillary to affect the temperature control.

Simple Main Constant Flow Circulation Loop Feeding Satellites In Series

Figure 1:
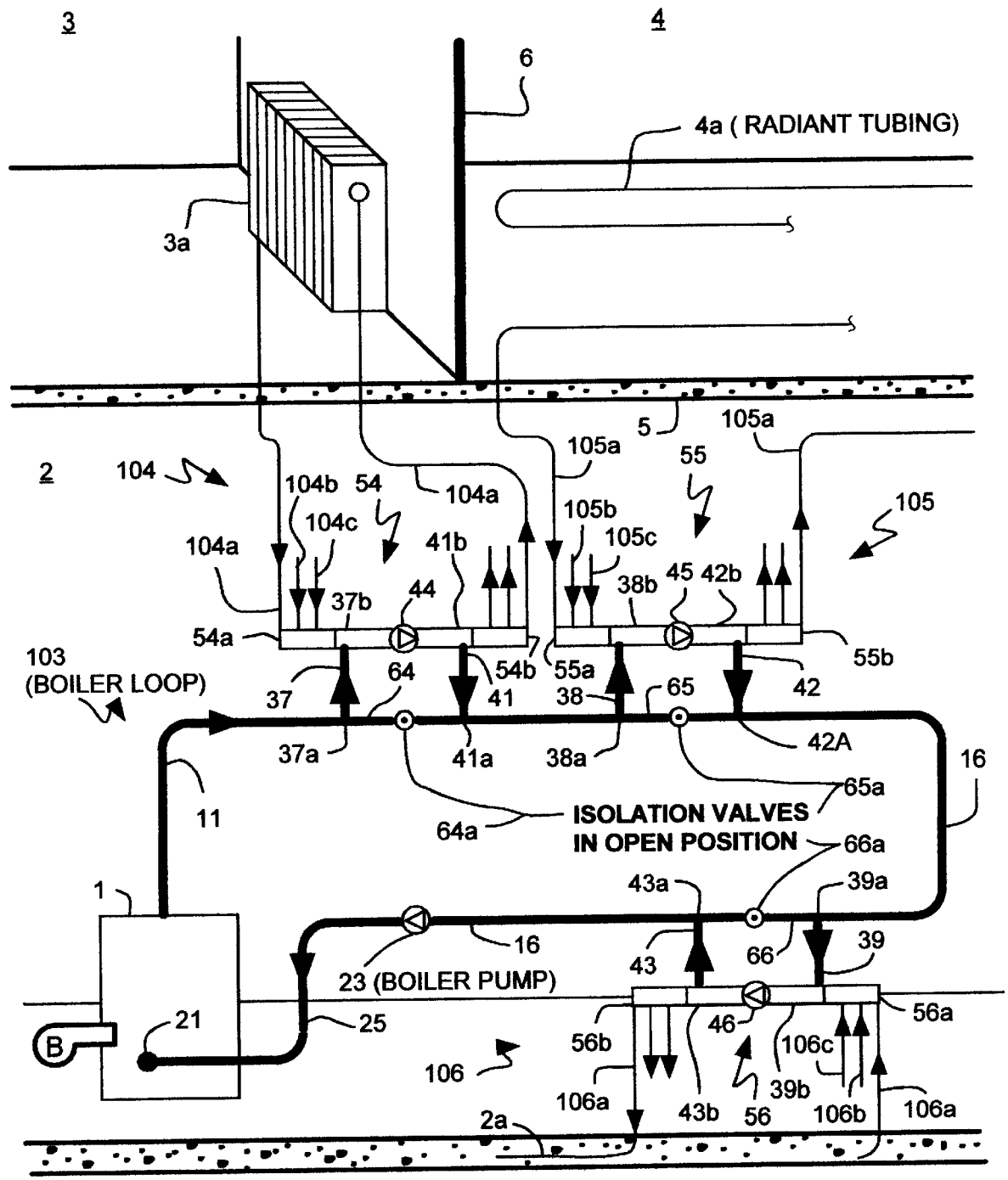
FIG. 1 is a schematic diagram of a hydronic heating system in a premises with a main constant circulation system in the premises basement where the hot water boiler is located feeding three separate satellite stations in series, each satellite station having at least one heating loop of a "Kind" that requires lower water temperature than fed to the main and some of which heat rooms of the premises above the basement.

Turning first to FIG. 1 there is a schematic diagram of a typical hydronic heating system installed in a dwelling incorporating a main constant circulation system that feeds three separate satellite constant circulation stations in series, each satellite station having one or more heating loops of a kind that requires lower water temperature than the main according to a predetermined temperature limit. This system in a premises such as a dwelling includes in the basement 2 a boiler 1 that supplies the main circulation loop (the boiler loop) 103 and its three satellites 104, 105 and 106. It may also supply the dwelling domestic hot water (DHW) tank (not shown). The usual requirement of the system is to provide DHW water at about 180° F. to 200° F., which is the usual hot water temperature requirement for washing machines and dish washers and the same boiler supply also feeds the main loop 103.

The main circulation loop 103 accepts supply water at the high temperature 180° F. and includes the boiler supply line 11 that may includes a unidirectional check valve and an isolation ball valve (not shown in this figure) and the main circulation loop pipe 16 At the other end of loop 103 a similar tubing connection is provided to the boiler return reservoir 21 includes main water pump 23, boiler return line 25 and may include another isolation ball valve in the return line.

Satellite stations 104, 105 and 106: are fed main water by injection lines 37, 38 and 39, they return water to the main by lines 41, 42 and 43 and they are driven by continuous pumps 44, 45 and 46, respectively.

The interchangeable modular units of satellite stations 104. 105 and 106 are modular units 54, 55 am 56, respectively. Such a satellite station modular unit is shown enlarged in detail in FIG. 2.

Station 104 modular unit 54 includes: a short pipe section 64 of the main circulation loop in which there is the satellite isolation valve 64a; injection 37a and return 41a T fittings at the ends of the short section; satellite injection pipe 37 and return pipe 41 from the T fittings 37a and 41a, respectively; the satellite pump 44; an injection T connection 37b from the injection pipe to the pump; and a chamber connection 41b from the pump to the satellite supply header 54b. The chamber contains the body 71 of automatic satellite water temperature control valve 70 that, in effect, controls injected hot water flow from the main (injected heat) by controlling return water flow from the satellite to the main in return pipe 41 as described more fully hereinbelow with respect to FIGS. 3 and 4.

Similarly for station 105 modular unit 55 includes: a short pipe section 65 of the main circulation loop in which there is the satellite isolation valve 65a; injection 38a and return 42a T fittings at the ends of the short section; satellite injection pipe 38 and return pipe 42 from the T fittings 38a and 42a, respectively; the satellite pump 45; an injection T connection 38b from the injection pipe to the pump; and a chamber connection 42b from the pump to the satellite supply header 55b. Also here the chamber contains the body 71 of automatic satellite water temperature control valve 70 that, in effect, controls injected hot water flow from the main (injected heat) by controlling return water flow from the satellite to the main in return pipe 42 as also described more fully hereinbelow with respect to FIGS. 3 and 4.

Similarly for station 106 modular unit 56 includes: a short pipe section 66 of the main circulation loop in which there is the satellite isolation valve 66a; injection 39a and return 43a T fittings at the ends of the short section; satellite injection pipe 39 and return pipe 43 from the T fittings 39a and 49b from the injection pipe to the pump; and a chamber connection 43b from the pump to the satellite supply header 56b. Also here the chamber contains the body 71 of automatic satellite water temperature control valve 70 that, in effect, controls injected hot water flow from the main (injected heat) by controlling return water flow from the satellite to the main in return pipe 43 as also described more fully hereinbelow with respect to FIGS. 3 and 4.

Satellite stations 104, 105 and 106 each have a supply header and a return connected to the modular unit thereof so that water flow to the supply header is driven by the station pump and the pump input includes satellite return water from the return header and injected hot water from main loop 103 that are combined and mixed in the pump raising, in effect raising the temperature of the return water which is pumped to the satellite supply header.

The supply header and return header in each satellite station has connections for one or more heating loops that heat rooms in the premises. For example, satellite station 104 modular unit 54 has connected thereto return header 54a and supply header 54b that feeds heating loops 104a, 104b and 104c. Of these, heating loop 104a feeds a wall radiator 3a in room 3 above the basement 2. The other heating loops 104b and 104c are represented only by connections to the supply and return headers and may heat other rooms in the premises.

For satellite station 105, modular unit 55 has connected thereto return header 55a and supply header 55b that feeds heating loops 105a, 105b and 105c. Of these, heating loop 105a feeds radiant tubing 4a in the floor of room 4 above the basement 2. The other heating loops 105b and 105c are represented only by connections to the supply and return headers and may heat other rooms in the premises.

For satellite station 106, modular unit 56 has connected thereto return header 56a and supply header 56b that feeds heating loops 106a, 106b and 106c. Of these, heating loop 106a feeds radiant tubing 1a in the floor of the basement 2. The other heating loops 106b and 106c are represented only by connections to the supply and return headers and may heat other rooms in the premises.

Figure 2:
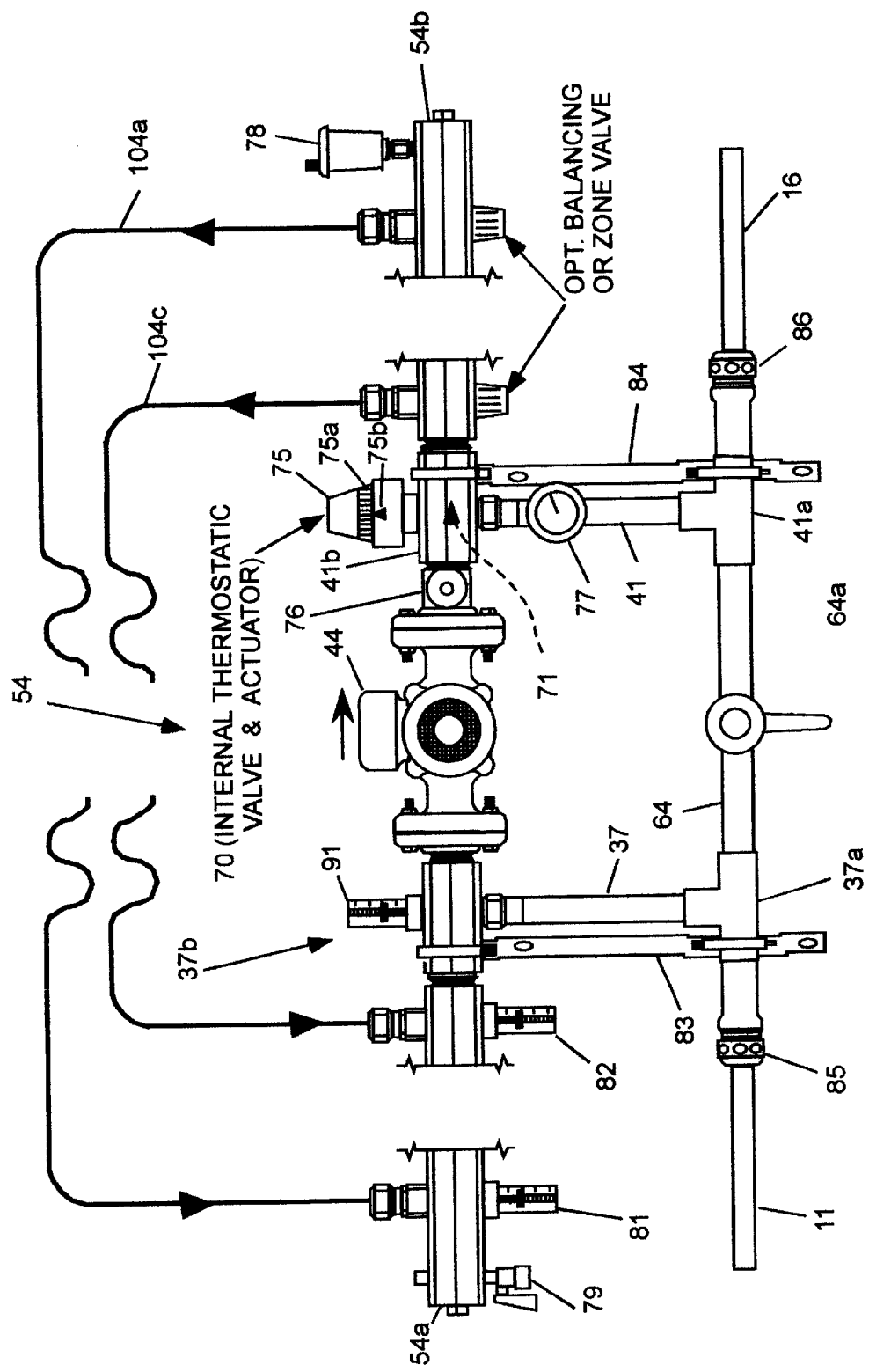
FIG. 2 is an enlarged front view of the satellite station interchangeable modular unit with the satellite supply and return headers attached that feed the satellite heating loops, the modular unit being equipped with automatic satellite injected water flow (injected heat flow) controlled by a thermostatically valve according to the present invention.
Figure 3:
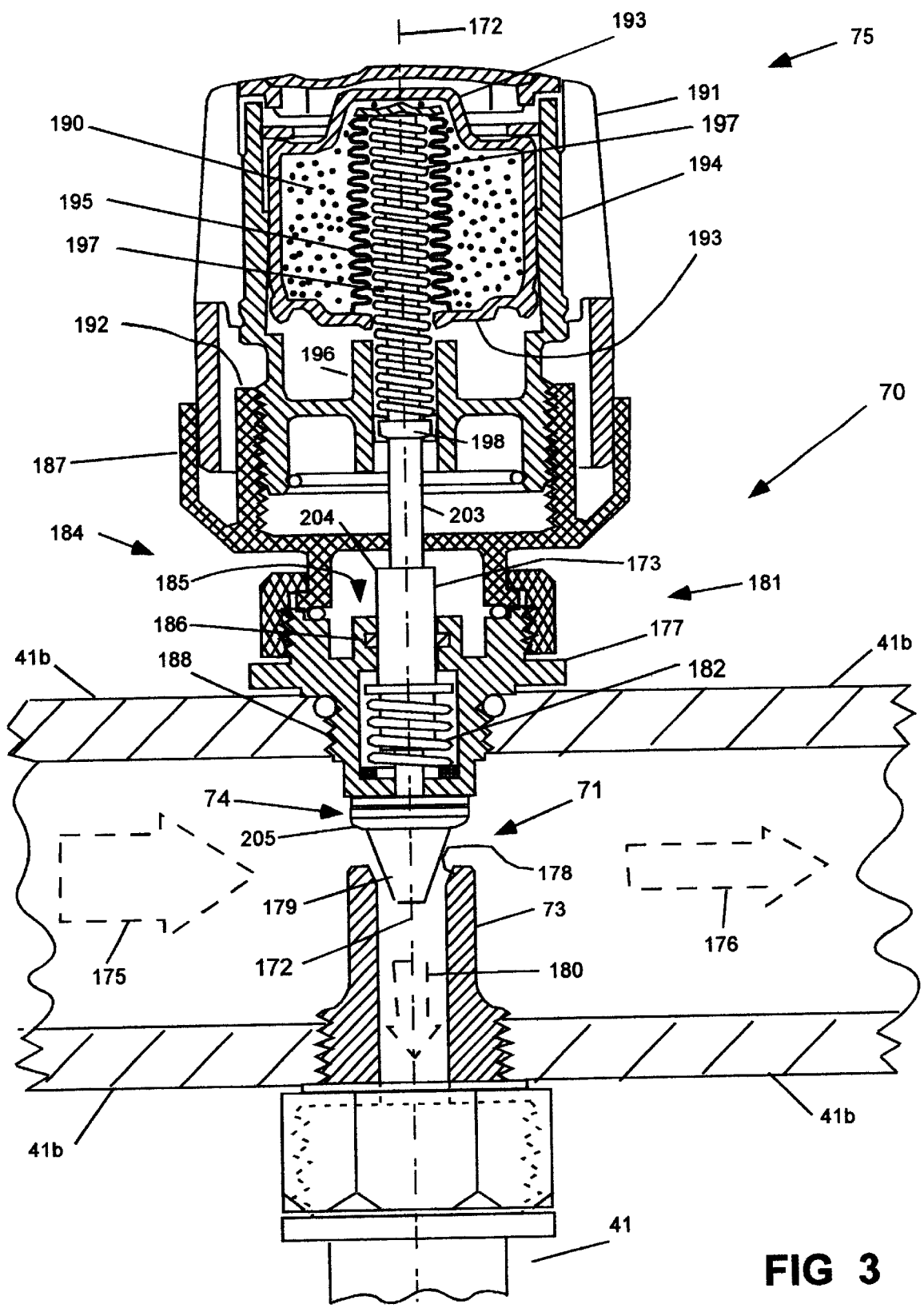
FIGS. 3 and 4 are cross-section views of the satellite station modulating thermostatic temperature control valve showing the valve body immersed in a chamber through which all of the station supply water flows and the valve external actuator that respond to the water temperature and modulate the valve position accordingly, FIG. 3 showing the valve fully open for maximum heat injection and FIG. 4 showing the valve fully closed for no heat injection, depending on the water temperature in the chamber.
Figure 4:
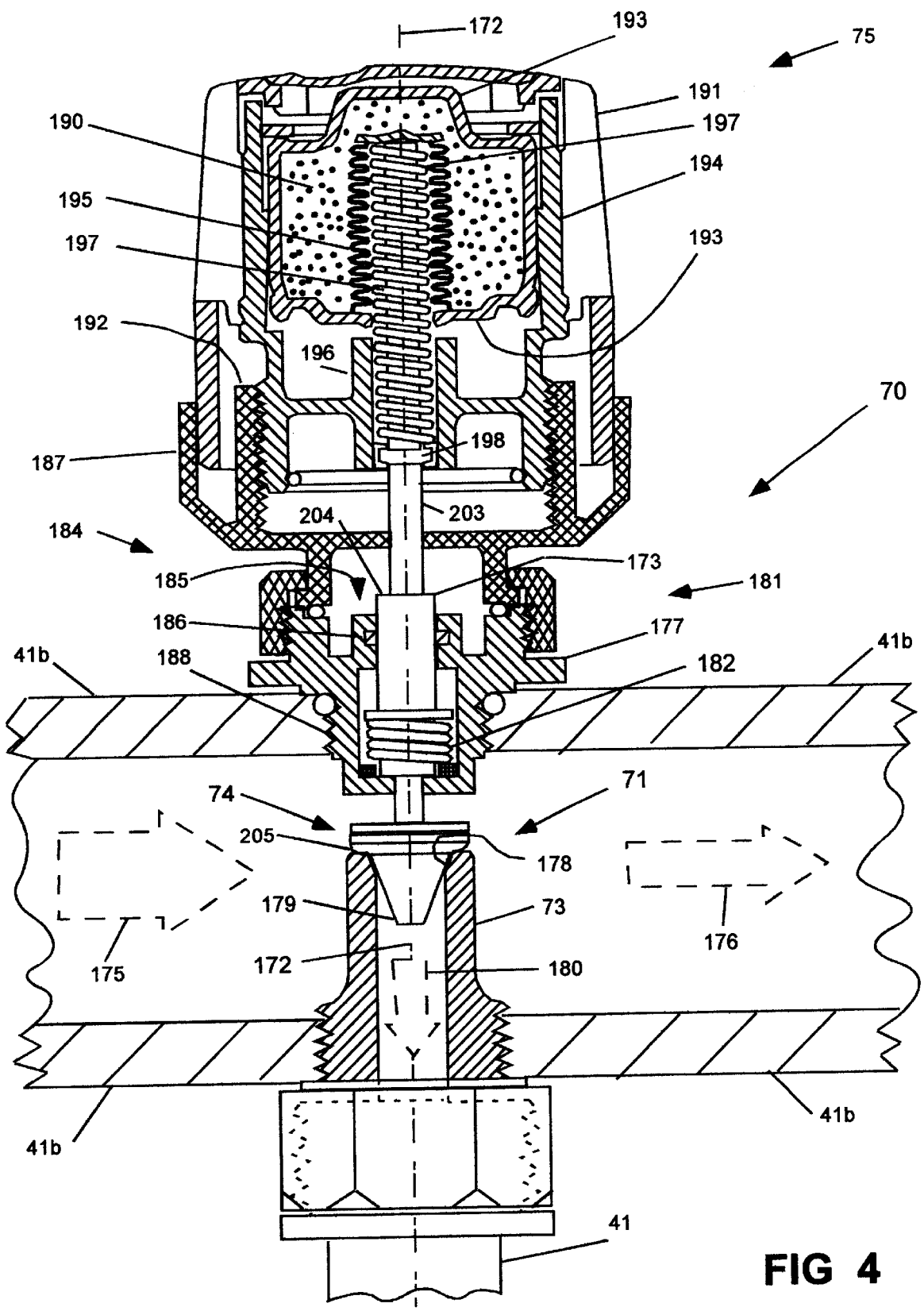

In any of the satellite stations, the modular unit chamber between the pump output and the supply header includes a unique thermostatically controlled temperature modulating valve according to the present invention, shown in FIGS. 3 and 4, that is pre-set to automatically maintain the temperature of the satellite water flow at a predetermined value. For example, it may be maintained at high, medium or low temperature as compared with the main circulation system boiler supply temperature which is at the highest temperature. For example, when the main boiler supply (highest temperature) is 180° F., high may be 150° F., medium may be 135° F. and low may be 90° F. Also in any of the satellite stations the injection T connection may include an injection water flow limit device as described more fully herein below with reference to FIG. 2.

Interchangeable Modular Unit

FIG. 2 is an enlarged detailed view of a modular unit such as 54, 55 or 56 in FIG. 1, that incorporates a thermostatically controlled satellite water temperature control valve according to the present invention. For purposes of description the drawing shows modular unit 54 of satellite station 104.

The modular unit 54 includes a section of pipe 64 that connects by injection T fitting 37a to the main boiler loop supply line 11 and by return T fitting 41a to the boiler loop 103 line 16 that feeds the return line 25 to the boiler. From injection T filling 37a, injection pipe 37 connects to injection T connection 37b that connects on one side of the T to the input of pump 44 and on the other side accommodates attachment of return header 54a.

The output of pump 44 flows through chamber 41b to supply header 54b and inside the chamber fully immersed in the satellite supply water the body 71 of the temperature control valve 70 feeds a controlled flow to return pipe 41 back to the main at return T filling 41a. Details of the control valve 70 arte shown in FIGS. 3 and 4.

Injection T connection 37b may contain a flow limiting device for the injection flow of hot water from the boiler.

That device may be a flow meter 71 that has a stop that is set to limit the injection flow into the satellite system.

Chamber connection 41b feeds all of the supply water flow to supply header 54b and also contains the body 71 of the control valve 70, so controlled that it modulates the return flow to the main. Thus valve 70 is a unique thermostatically controlled two-way modulated satellite water temperature control valve for modulating the satellite water temperature to maintain that temperature at a manually preset value.

Valve 70 includes the valve body 71 and the valve actuator 75, shown in detail in FIGS. 3 and 4. This valve modulates the flow of return water through pipe 41 from the satellite system to the main boiler loop 103, depending on the temperature of the satellite water from the pump 44 fed to supply header 54b. For that purpose, the valve body is totally immersed in the satellite supply water and thermally connects to thermostatic valve actuator 75 that is attached to the valve body and modulates the valve.

The operation of control valve 70 is described hereinbelow with respect to FIGS. 3 and 4. Depending on the manual setting of the actuator 75 as indicated by the scale 75a position at index 75b then valve is modulated from fully closed to a maximum open position to reduce or increase injected hot water flow from the main into the satellite through pipe 37 and so the satellite water temperature is reduced or increased to maintain the temperature called for by the manual setting of scale 75a.

In-line ball valve 76 may be provided to manually restrict flow from the pump, which may be required if the total flow to the satellite heating loops must be reduced. This may occur, for example, if only one loop is turned on. An air vent 78 is provided in supply header 54b and a purge valve 79 is provided in return header 54a.

Optional flow meters 81 and 82 in return header 54a can be set to limit the flow through heating loops 104a and 104c, respectively. Setting flow meters 81 and 82 sets the ratio of flows through loops 104a and 104c.

Mounting brackets 83 and 84 provide means for mounting modular unit 54 to a wall or other support.

In operation with other satellite stations turned on, isolation valve 64a is open(turned with the handle thereof parallel to pipe 64), the main boiler loop pump is turned on and the satellite pump is turned on. Flow through loops 104a and 104c is limited by flow meters 81 and 82, injected hot water flow is modulated by thermostatically controlled valve 70 depending on the manual setting of the valve actuator scale 75a.

As described more fully with respect to FIGS. 3 and 4 that show the valve 70 in cross-section, if the satellite mixed water temperature from the pump is lower than called for by the setting of actuator scale 75a, the valve 70 opens, as shown in FIG. 3, allowing more hot injected water flow into the satellite station through injection pipe 37, up to the limit set by flow meter 91. The injected hot water is mixed with the satellite loop return water from return header 54a in pump 44 and fed through chamber 1b to supply header 54b from which it is distributed to loops 104a and 104c (as well as loop 104b shown in FIG. 1).

On the other hand if the mixed water from pump 44 temperature is higher than called for by the setting of actuator scale 75a, valve 70 closes, as shown in FIG. 4, reducing the flow of injected hot water flow into the satellite station.

The modular unit 54 and the modular units of other satellite stations are preferably the same and so may be interchangeable. For each installation the flow meters and thermostatic actuator are set depending on the "Kinds" of heating loops they feed and the requirements and limitations of those loops. Since each satellite station modular unit has an isolation valve, any one of them can be operated alone without requiring the main boiler loop pump to be turned on.

A modular unit such as 54 is connected to the main boiler loop 103 by copper or PEXTRON tubing connectors 85 and 86 of T fittings 37a and 41a, respectively.

Satellite Temperature Control Valve (Internal Thermostatic Valve & Actuator 70)

FIG. 3 and FIG. 4 each show two-way modulated control valve 70 in cross-section through the valve axis 172 which is defined by the valve stem 173. All of the parts of the valve except the input 175 and the output 176 water flow passage through chamber 41b are figures of revolution about the axis and as such are completely revealed by the view in these Figures.

The water input 175 to chamber 41b is from pump 44 and the water output 176 is to supply header 54b. When the control valve 70 opens, another output from the chamber is the return water from the satellite station to the main loop 16 in return water line 42 and that water flow results in a corresponding injection flow of hot water from the main into the satellite through injection water line 37 (also called heat injection).

A suitable structure of the immersed valve body 71 includes the moveable tapered plug assembly 74 and the fixed seat assembly 73. Flow through the valve is through the seat 178 to the extent that the seat is uncovered by the tapered plug 179 attached to the end of the stem 173, and that flow is indicated by arrow 180. It is the return flow to the main.

The valve spindle spring assembly 181 is contained in the assembly housing 177 and includes coil spring 182 and spring container 183 and the housing screws into the wall of chamber 41b wall at 188. The valve body housing, spring retainer ring 184 and the valve body stem 173 are all concentric and except for threads are figures of revolution about the valve axis 172. Plugging the top of the spring container is the stem gland assembly 185 that contains suitable packing material 186 to the stem, so that the stem is slidably carried within the housing 177 by the gland assembly and is spring loaded by coil spring 182 which urges the stem to move in a direction that opens the water flow passage through the valve, to the position shown in FIG. 3.

The actuator part 75 of the valve moves the valve body stem 173 against spring 182 and is done by delivering a force to the stem to overcome the spring resistance. It is a push/release type actuator action adapted herein to respond thermostatically to the input water temperature.

Actuator head 75 includes: the actuator fixed holder cup 187 that is fixedly attached to the valve body housing 177 by threaded ring 188 that engages threads in the housing; and the adjustable head 191 that is a cylinder 191 containing parts fixed to the inside thereof that adjustably screws into the holder 187 by thread engagement 192. Inside the cylinder 191, fixedly attached thereto and contained therein are: sealed thermostatic fluid container 193 attached by inner cylinder 194 that threadably engages the fixed holder cup 187 at threads 192; closed, sealed bellows 195 that is attached to container 193 and sealed thereto at the bottom thereof; and stem guide 196.

Inside the bellows 195 is the bellows spring 197 that extends from the top sealed end of the bellows, down to stem stop 198 that is fixed to the actuator stem 203, inside guide 196. Thus, an expansion of the thermostatic fluid 190 drives the bellows downward and the bellows spring drives the actuator stem 203 downward, overcoming the stem spring resistance and closing the flow passage between plug 179 and seat 178 in the valve body, which reduces the return water flow 180 to return line 41.

An efficient thermal connection from the water at input 175 to the thermostatic fluid 190 is through valve plug 179, valve stem 173, actuator stem 203, bellows spring 197 and bellows 195, which shares a large heat transfer surface with the thermostatic fluid 190. This thermal connection is enhanced further by making all parts of the valve plug 179, valve stem 173 and actuator stem 203 of highly thermally conductive material. For this purpose, the stems may be made of copper and heavier than usual to provide the necessary strength. Also, a thermally conductive grease 204 may be applied between stems 173 and 203 to enhance the thermal contact therebetween. The plug also has a rubber pad 201 for contacting and closing against the valve seat 178.

FIGS. 3 and 4 show similar cross-section views of the satellite modulating thermostatic temperature control valve 70 showing the valve and actuator internal mechanisms described herein-above that respond to the satellite water temperature in chamber 41b in which the valve body is immersed and modulate the valve position accordingly, FIG. 3 shows the valve open when satellite water temperature is low for high heat injection and FIG. 4 shows the valve closed when the water temperature is high for no heat injection, In both cases the adjustable manual setting achieved by screwing the cylinder 191 into or out of holding cup 187 to select the scale 75a value on the index 75b sets the maximum open position of the valve and that scale value corresponds to the maximum modulated satellite water temperature.

Main Circulation Loop Feeding A Single Satellite

Figure 5:
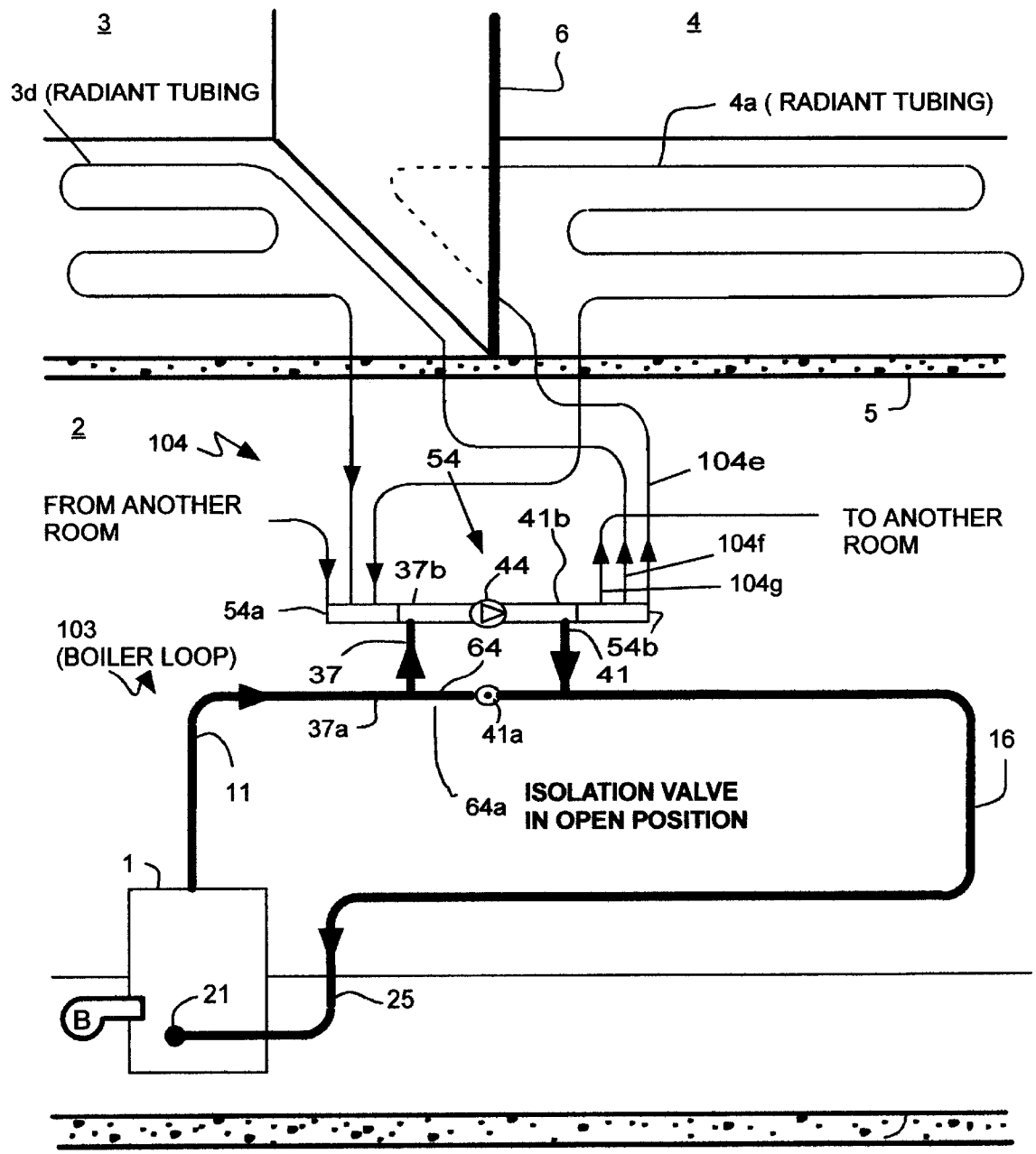
FIG. 5 is a schematic diagram illustrating operation of radiant hydronic heating system of FIG. 1 with only one satellite station turned on, the main system pump turned off and the one satellite station isolation valve closed, as may be done during times when minimum heating of the premises is desired.

FIG. 5 illustrates an operation of the hydronic system shown in FIG. 1 wherein only one of several satellite stations is turned on. This may be sufficient for the premises during late spring or early fall seasons when the demand for heat in the premises is low. In this example only one satellite station 104 is turned on by simply turning on pump 44 of the station modular unit 54 and of course the boiler is turned on so that hot water is supplied in line 11. Since other satellite stations are not turned on in this example, they are not shown in FIG. 4. In addition, the main boiler loop pump 23 is not turned on and so it is not shown in FIG. 4. For this operation, isolation valve 64a of the modular unit is closed and so flow in the total system is compelled only by the satellite pump 44.

In operation, injected water from the boiler in injection pipe 37 flows into pump 44 along with return water from return head 54a and these flows are mixed in the pump and depending on the temperature responsive control valve of the present invention in chamber connection 41b, some of the pump output that normally is fed to supply header 54b is returned by return pipe 41 to main line 16 and to boiler return line 25 to the boiler for reheating.

Supply header 54b feeds the satellite heating loops 104e, 104f and 104g. Loop 104e goes through floor 5 into radiant tubing 4d in the floor of room 4. Loop 104f goes through floor 5 into radiant tubing 3d in the floor of room 3 and loop 104g feeds another heating loop in another room not shown

CONCLUSIONS

While the invention is described herein in connection with preferred embodiments, it will be understood that it is not intended to limit the invention to those embodiment. It is intended to cover all alternatives, modifications, equivalents and variations of those embodiments and their features as may be made by those skilled in the art within the spirit and scope of the invention as defined by the appended claims.

What is claimed is:

1. A hydronic heating system having a boiler providing hot supply water and a reservoir of cooler return water, a boiler supply water line and a boiler return water line to said boiler reservoir, comprising,
   (a) a main loop fed boiler supply water by said boiler supply line, a main water pump compelling water flow through said main loop from said boiler supply line to said boiler return water line,
   (b) a satellite distribution station feeding one or more satellite station heating loops,
   (c) a satellite injection water connection along said main loop and a satellite return water connection along said main loop,
   (d) said satellite distribution station including a satellite heating loop supply header and satellite heating loop return header at opposite ends of said satellite loop and a satellite station pump pumping satellite water from said satellite return header to said satellite supply header,
   (e) a water temperature control valve body for modulating water flow through the satellite return water line to the main loop to control satellite water temperature constant,
   (f) said control valve body is immersed in said satellite water and
   (g) a thermostatic actuator attached to said valve for controlling the position of said valve in response to the satellite water temperature,
   (h) said control valve body has a seat, a moveable plug and a plug stem and
   (i) said thermostatic actuator positions said valve in response to heat flow from said valve plug, through said stem to said actuator,
   (j) whereby said valve controls heat flow from said main loop to said satellite loop.

2. A hydronic heating system as in claim 1 wherein,
   (a) said satellite injection water connection along said main loop, said satellite return water connection along said main loop, said satellite station pump, said satellite injection water line from said satellite injection connection along said main loop to said satellite pump input and said satellite return water line from said satellite pump output to said satellite return connection along said main loop are provided as a modular unit that is interchangeable between satellite stations.

3. A hydronic heating system as in claim 1 wherein,
   (a) an isolation valve for a satellite is provided along said main loop between said satellite injection water connection along said main loop and said satellite return water connection along said main loop.

4. A hydronic heating system as in claim 3 wherein,
   (a) said isolation valve for a satellite is part of said satellite station modular unit.

5. A hydronic heating system as in claim 4 in a premises having a boiler room and other rooms that are heated by said satellite station heating loops, wherein,
   (a) said boiler and main loop are located in said boiler room and said satellite heating loops have parts thereof that are in said other rooms.

* * * * *